United States Patent [19]
Ott et al.

[11] Patent Number: 5,447,143
[45] Date of Patent: Sep. 5, 1995

[54] DEVICE FOR DETECTING THE POSITION OF AT LEAST ONE SHAFT WHICH HAS A REFERENCE MARK

[75] Inventors: Karl Ott, Markgroeningen; Klaus Walter, Bietigheim-Bissingen; Joachim Heimes, Eberdingen; Joachim Strate, Bietigheim-Bissingen; Klaus Boettcher, Oberriexingen, all of Germany

[73] Assignee: Robert Bosch GmbH, Stuttgart, Germany

[21] Appl. No.: 211,785

[22] PCT Filed: Aug. 20, 1993

[86] PCT No.: PCT/DE93/00761
§ 371 Date: Apr. 18, 1994
§ 102(e) Date: Apr. 18, 1994

[87] PCT Pub. No.: WO94/07014
PCT Pub. Date: Mar. 31, 1994

[30] Foreign Application Priority Data

Sep. 12, 1992 [DE] Germany .................. 42 30 616.7

[51] Int. Cl.⁶ ............................................. F02P 9/00
[52] U.S. Cl. ................................................ 123/612
[58] Field of Search .............. 123/612, 414, 614, 617, 123/416, 417, 418

[56] References Cited

U.S. PATENT DOCUMENTS

| | | | |
|---|---|---|---|
| 4,827,866 | 5/1989 | Maeda | 123/612 |
| 4,869,221 | 9/1989 | Abe | 123/414 |
| 5,263,450 | 11/1993 | Hashimoto et al. | 123/414 |
| 5,284,114 | 2/1994 | Fukui | 123/612 |
| 5,329,904 | 7/1994 | Kokubo et al. | 123/612 |

FOREIGN PATENT DOCUMENTS 0017933 10/1980 European Pat. Off. ........ 123/612 X

*Primary Examiner*—Raymond A. Nelli
*Attorney, Agent, or Firm*—Michael J. Striker

[57] ABSTRACT

A device for detecting the position of a shaft of an internal combustion engine is described, in which a sensor disc which is connected to the shaft and has at least one reference mark is sensed by at least one sensor and the output signals obtained are evaluated in the control device. So that the position of the shaft is known immediately after the internal combustion engine is started up, the last position to be determined after the internal combustion engine is switched off and after the shaft coasts to a standstill is stored in a nonvolatile memory of the control device and, after the internal combustion engine is switched on again, is used to determine and output the first fuel injections during a starting phase.

In order to improve the accuracy, a detection of the direction of rotation is additionally carried out so that a correction can take place if the shaft turns backwards to a certain degree as a result of the engine swinging back.

25 Claims, 2 Drawing Sheets

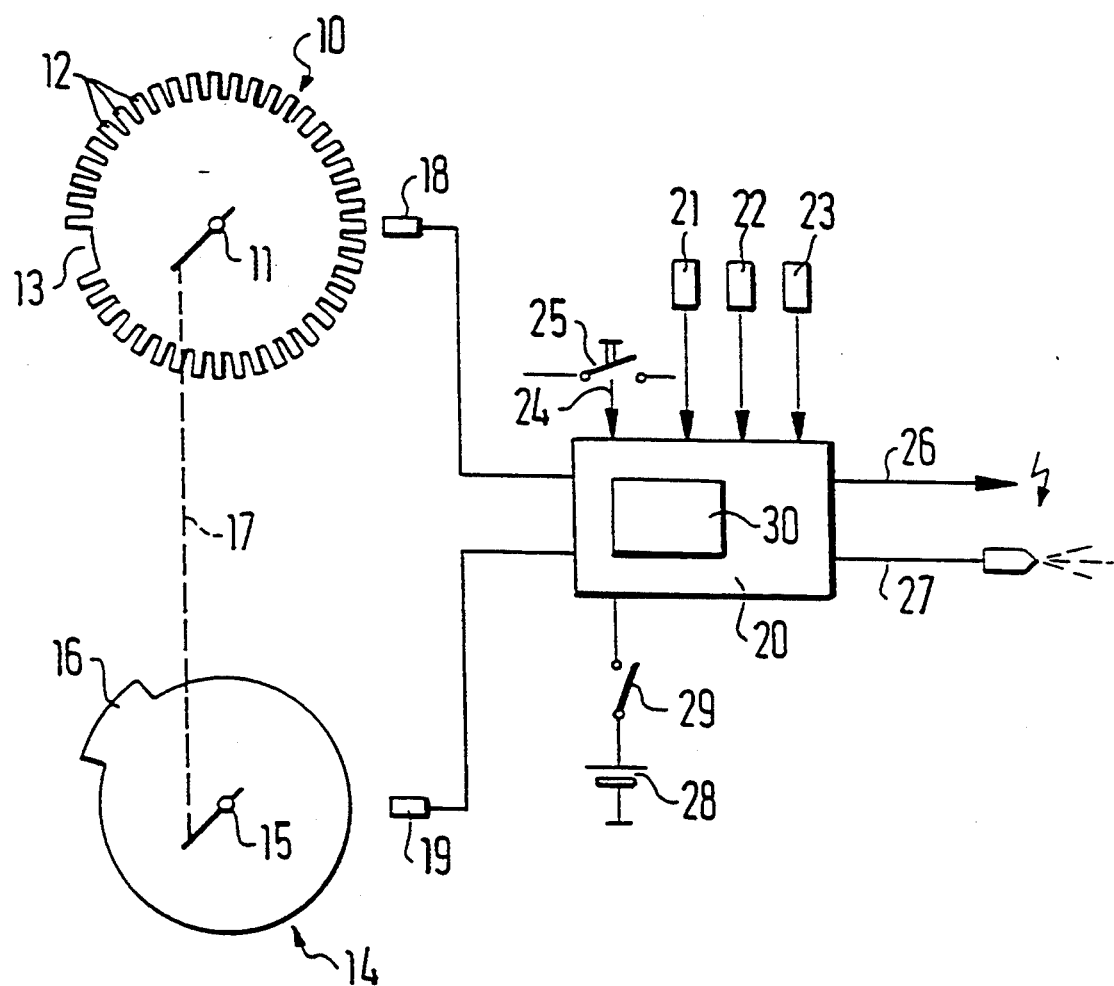

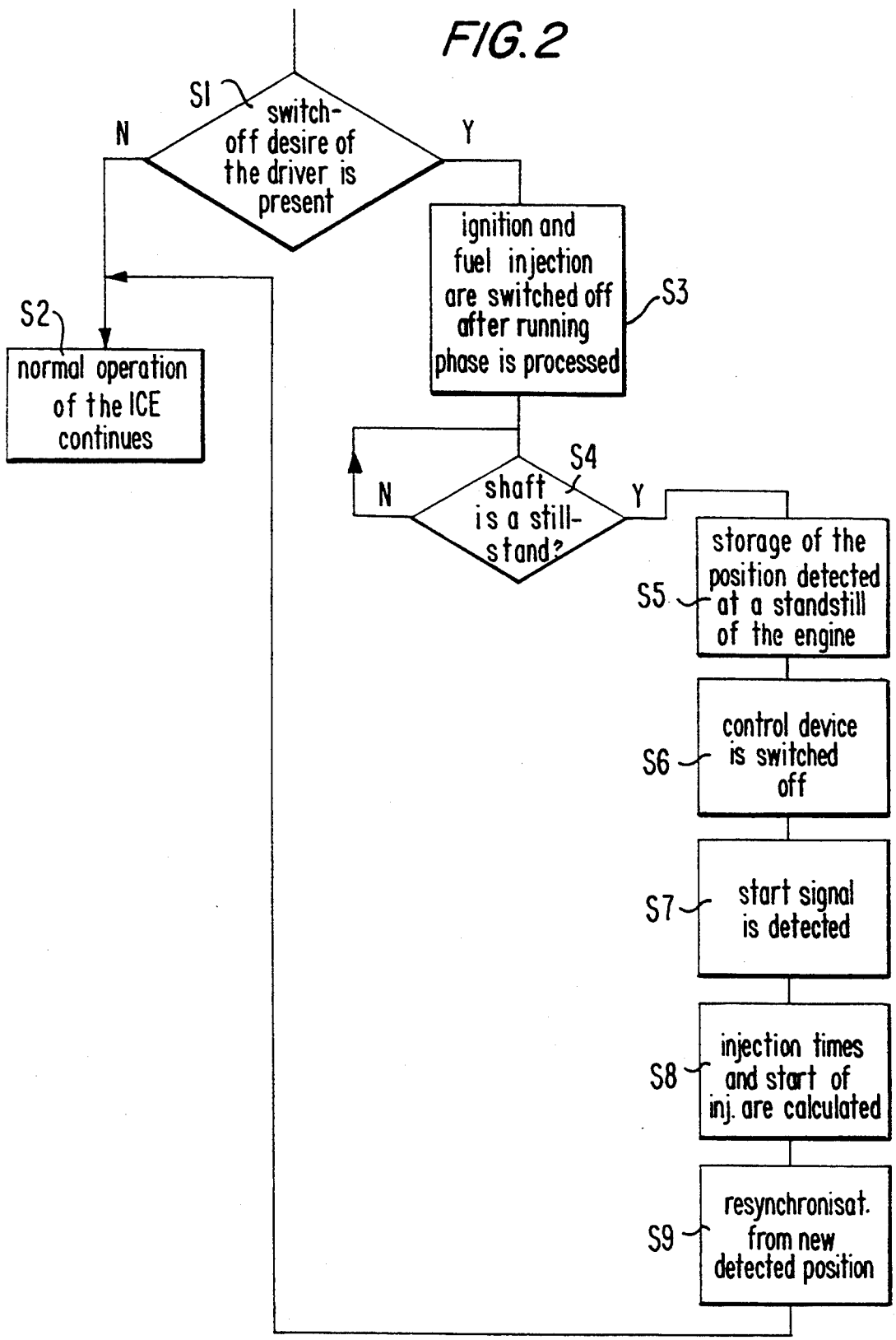

DEVICE FOR DETECTING THE POSITION OF AT LEAST ONE SHAFT WHICH HAS A REFERENCE MARK

PRIOR ART

The invention is based on a device for detecting the position of at least one shaft which has a reference mark or at least one sensor disc, which has a reference mark and is connected to the shaft, of the generic type of the main claim and can be used in particular in conjunction with the control of the fuel injection in internal combustion engines.

In a multi-cylinder internal combustion engine in which it can be calculated in a control device when and how much fuel per cylinder is to be injected, it must be ensured that the fuel is fed to the individual cylinders at the correct time and in the correct quantity. So that the calculations can be carried out correctly, the respective position of the crankshaft or camshaft of the internal combustion engine must be known; it is therefore customary, and is described for example in EP-PS 0 017 933, for the crankshaft and the camshaft to be each connected to a disc on whose surface at least one reference mark is provided, a plurality of marks of the same kind, also referred to as increments, usually being additionally provided on the crankshaft disc.

The two rotating discs are sensed by appropriate fixed sensors. Unambiguous information relating to the position of crankshaft and camshaft can be acquired from the sequential timing of the pulses supplied by the sensors, and corresponding drive signals for the ignition system or fuel injection system can be calculated in the control device.

The known system has the disadvantage that unambiguous position detection is only possible after a specific degree of rotation of the two shafts since, for this position detection, it is necessary to wait until the reference marks pass by the respective sensors. So that a correct fuel injection can take place directly after the internal combustion engine starts, the exact position should, however, be known immediately after starting.

ADVANTAGES OF THE INVENTION

The device according to the invention having the characterizing features of Claim 1 has the advantage that the position of the camshaft or crankshaft is known in the control device directly after the internal combustion engine is switched on so that the said control device can begin immediately to assign the injection to the cylinders appropriately.

This is made possible in that coasting detection takes place after the ignition and fuel injection systems are switched off, the coasting detection starting after the ignition lock is switched off. During the after-running phase, the signals supplied by the sensors are still evaluated by the control device. This evaluation does not end until the crankshaft or camshaft has come to a standstill.

The detection of the angular positions of the two shafts when at a standstill which is thus possible is stored in a non-volatile memory in the control device and used for the calculations of the start of injection when the engine is restarted.

Further advantageous embodiments of the invention are disclosed in the subclaims. Here, it is advantageous that when the position of the shaft is determined when it is at a standstill, the data determined during the normal operation of the internal combustion engine are included in the calculations.

It is particularly advantageous that, after restarting, correction variables can be determined with the aid of the determined shut-off position and the crankshaft position found during the synchronization, with which correction variables the swinging back of the internal combustion engine can be compensated and, at the same time, these correction variables are preferably adaptable in a cylinder-selective fashion.

DRAWING

The invention is illustrated in the drawing and explained in greater detail in the subsequent description.

FIG. 1 shows a rough overview of the arrangement of crankshaft and camshaft together with the associated sensors and the control device in which the calculations take place.

In FIG. 2 there is a flow diagram which shows the sequence according to the invention.

DESCRIPTION OF THE EXEMPLARY EMBODIMENT

In FIG. 1, the components of an internal combustion engine which are required for the explanation of the invention are illustrated by way of example. Here, a sensor disc is designated by 10, which disc is connected rigidly to the crankshaft 11 of an internal combustion engine and has on its circumference a plurality of angular marks 12 of the same kind. In addition to these angular marks 12 of the same kind, a reference mark 13 is provided which is realized for example by means of the absence of two angular marks.

A second sensor disc 14 is connected to the camshaft 15 of the internal combustion engine and has on its circumference a segment 16 with which the phase position of the reference mark on the crankshaft disc is determined. 17 indicates the connection present between crankshaft and camshaft, the said connection rotating the camshaft at half the rpm of the crankshaft.

The illustrated shape of the sensor discs connected to the crankshaft or camshaft is exemplary and other shapes can be chosen to replace it.

The two sensor discs 10, 14 are sensed by sensors 18, 19, for example inductive sensors or Hall sensors, and the signals which are produced in the sensors as the angular marks pass by are fed to a control device 20 and prepared there in a suitable manner, for example each edge of a mark producing a pulse. These pulses and their sequential timing are further processed in the control device 20.

The control device 20 receives via various inputs further input variables which are required for the open-loop or closed-loop control of the internal combustion engine, which variables can be measured by various sensors. The following are examples of such sensors: a temperature sensor 21 which measures the engine temperature, a throttle valve sensor 22 which records the position of the throttle valve, a pressure sensor 23 which measures the pressure in the intake manifold or the pressure in a cylinder of the internal combustion engine. Furthermore, via the input 24 an "ignition on" signal is fed which is supplied by the terminal KL15 of the ignition lock when the ignition switch 25 is closed.

On the output side, the control device which comprises a computing or storage means (not illustrated) and a permanent memory, designated by 30, provides signals for the ignition and fuel injection for appropriate components (not designated in greater detail) of the internal combustion engine. These signals are output via the outputs 26 and 27 of the control device 20.

Depending on requirements, further sensors can be used whose signals are fed to the control device; the control device 20 can also output further signals required for the closed-loop control of the internal combustion engine. It is not necessary either for all the illustrated sensors to be present.

The voltage is supplied to the control device 20 in a customary manner with the aid of a battery 28 which is connected to the control device 20 via a switch 29 whilst the internal combustion engine is operating and during an after-running phase after the engine is switched off.

With the device described in FIG. 1, the position of the two shafts 11, 15 can be detected at any time during the operation of the internal combustion engine. Since the assignment between crankshaft and camshaft is also known, as is the assignment between the position of the camshaft and the position of the individual cylinders, after the detection of the reference mark a synchronization can take place and after a synchronization has taken place the fuel injection and the ignition can be open-loop or closed-loop controlled in a known manner. Such control of an internal combustion engine is described for example in the German Offenlegungsschrift DE-A 39 23 478 and for this reason is not explained in greater detail here.

However, with the device described in FIG. 1 detection of the engine position according to the invention is also possible in the coasting mode during the so-called after-running phase. This after-running phase, which follows the customary normal operation of the internal combustion engine which is known for example from the abovementioned Offenlegungsschrift, will be explained with reference to the flow diagram according to FIG. 2.

In the control device 20, it is tested in step S1 whether a switch-off desire of the driver is present. This detection takes place by evaluating the "ignition on" signal supplied via input 24. If there is no switch-off desire, the normal operation of the internal combustion engine continues (step S2). If, on the other hand, a switch-off desire is detected, the ignition and fuel injection are switched off by the control device and the after-running phase is processed in step S3.

After the switching off of the ignition and of the fuel injection, the internal combustion engine or the motor coasts to a stop. The control device 20 is still active during an after-running phase. Within this after-running phase which is longer than the coasting phase of the engine, signals which are supplied by the sensors 18 and 19 are evaluated. Therefore, it is possible to count out the pulses caused by the marks 12 during the coasting phase.

Since the reference mark 13 of the sensor disc 10 is detected in each case by for example time intervals being evaluated between individual pulses, by counting out the pulses caused by the individual marks 12 the respective angular distance from the reference mark 13 can be determined so that the exact position of the disc 10, and thus of the shaft 11, is always known. The phase position is determined by comparing the crankshaft reference and camshaft signal.

It is thus also possible to determine the exact position of the shaft 11 and 15 when the shafts are at a standstill, and to store this position in a non-volatile memory 30 in the control device. The detection that the shaft is at a standstill is designated by step S4 and the storage in the non-volatile memory 30 of the position detected when the engine is at a standstill takes place in step S5.

After the after-running phase has expired, the control device is switched off in step S6, and it remains in the switched-off state until the engine is to be restarted. When restarting takes place, this restarting is detected by the control device again with the aid of the "ignition on" signal and access is immediately made to the information, stored in the non-volatile memory 30, relating to the position of the shaft 11 or 15.

In an internal combustion engine, after the normal operation in which the position of the crankshaft and of the camshaft as well as their synchronization are known, and a cylinder detection has taken place, an unambiguous determination of the position of the crankshaft and of the camshaft when at a standstill can take place by means of the evaluation of the signals of the sensors up until the engine comes to a standstill and the entire information can be stored in a non-volatile memory.

When the internal combustion engine is restarted, immediately after the start signal is detected in step S7, in step S8 the injection times and the start of the injection are calculated in relation to the angular position with reference to these stored data which indicate the position of the machine, and the injection for the next cylinder which can still be reached is output even before a renewed synchronization is present.

In step S9, a resynchronization takes place from the newly detected position of the crankshaft reference mark and camshaft reference mark, and the system goes over again to the normal calculation of the start of injection and the first ignition pulses are output by the control device.

The start and duration of injection during the entire start phase (before and after resynchronization) can be applied by means of various data.

In a further improvement, the direction of rotation of the engine is detected from the sequential timing of the individual pulses supplied by the sensors 18, 19 so that in the event of possible swinging back of the engine before it comes to a standstill the limit position can be appropriately corrected.

In addition, with the aid of the determined shut-off position and the crankshaft position actually found during synchronization it is possible to determine, after restarting, correction variables with which the error caused by the swinging back of the engine can be partially compensated. These correction variables can be adapted in a cylinder-selective fashion and can be included in the calculations occurring whenever restarting takes place.

If it is possible to detect the direction of rotation, an exact engine position can be determined continuously by counting out in the after-running phase the pulses supplied by the individual angular marks 12 so that the stored engine position is also exact and when restarting occurs the correct position is immediately available so that optimum injection can take place.

It is thus possible for the injection to be started in correct phase as early as the actuation of the starter so that all the cylinders can be appropriately supplied with fuel directly after switching on.

However if it is not possible to detect the direction of rotation, for example as a result of a fault, or if the engine stalls during switching off, that is to say the engine is switched off without an "ignition on/off" signal being supplied, the injection carried out during the start phase is not carried out with the aid of the stored position data but rather the system waits until a synchronization has taken place. The detection of such states takes place by means of plausibility tests.

We claim:

1. A fuel injection system for an internal combustion engine comprising: a shaft position sensor arranged to detect a reference indicator on said shaft and produce a corresponding sensor output signal representative of a rotational position of said shaft; a microprocessor responsive to said shaft position sensor output signal designed to provide control of one of ignition and fuel injection for said internal combustion engine; said microprocessor being programmed to evaluate said sensor output signal also during a phase after an ignition is switched off until said shaft rotation ceases; said microprocessor further including a non-volatile memory and functioning to store a detected shaft position signal at the instant of the cessation of shaft rotation in said non-volatile memory, providing a shaft "standstill position" signal to said non-volatile memory; said microprocessor further functioning to include said shaft "standstill position" signal data in the control calculations for one of the injection and ignition upon restart of said internal combustion engine.

2. A device as defined in claim 1, wherein said microprocessor is formed as a control device.

3. A device as defined in claim 1, wherein said shaft is a crankshaft of the internal combustion engine, said sensor being assigned to the crankshaft.

4. A device as defined in claim 1, wherein said shaft is a camshaft of the internal combustion engine, said sensor being assigned to the camshaft.

5. A device as defined in claim 1; and further including another shaft position sensor, a crankshaft disc provided with a plurality of marks and at least one reference mark and mounted on a crankshaft so that said first mentioned sensor senses said crankshaft disc, and a camshaft disc having at least one mark and mounted on a camshaft so that said camshaft disc is sensed by the other sensor and a phase position is determined by means of a defined position of said mark on said camshaft disc with respect to said reference mark on said crankshaft disc.

6. A device as defined in claim 1; and further including another shaft position sensor, a crankshaft disc provided with a plurality of marks and at least one reference mark and mounted on a crankshaft so that said first mentioned sensor senses said crankshaft disc, and a camshaft disc having a plurality of marks matched to a number of cylinders and mounted on a camshaft so that said camshaft disc is senses by the other sensor and a phase position is determined by means of a sequence of said marks on said camshaft disc.

7. A device as defined in claim 1; and further comprising a crankshaft disc mounted on a crankshaft and provided with a reference mark to be sensed by said sensor, said microprocessor being formed so that in order to determine exactly a position of the crankshaft a number of increments after the occurrence of said reference mark is counted.

8. A device as defined in claim 1; and further comprising another shaft position sensor, and a camshaft disc provided with a segment to be sensed by the other sensor for determining a phase position of said reference mark of said crankshaft disc, said microprocessor being formed so that in order to determine exactly a position of the camshaft the number of increments is counted in relation to a phase position.

9. A device as defined in claim 1; and further comprising a disc mounted on said shaft and having a reference mark, said microprocessor being formed so that when the internal combustion engine is switched on again after a detection of said reference mark of the shaft, a synchronization is carried out and said microprocessor goes over to normal determination of an injection angular position.

10. A device as defined in claim 1, wherein said microprocessor is formed so that a detection of a direction of rotation of the shaft takes place.

11. A device as defined in claim 1, wherein said control device is formed is so that a correction of a shut-off position takes place if the internal combustion engine turns backwards and the correction takes place by counting out increments during a reverse travel.

12. A device as defined in claim 1, wherein said control device is formed so that a correction of a shut-off position takes place if the internal combustion engine turns backwards, the correction taking place by comparing a determined shut-off position and a shaft position found during a synchronization.

13. A device as defined in claim 1, wherein said microprocessor is formed so that adaptable correction valuables are formed and an adaptation takes place in a cylinder-selective fashion.

14. A method of controlling fuel injection in an internal combustion engine, comprising the steps of detecting a reference indicator on said shaft by a shaft position sensor and producing a corresponding sensor output signal representative of a rotational position of said shaft; providing control of one of ignition and fuel injection for said internal combustion engine by a microprocessor responsive to said shaft position sensor output signal; programming said microprocessor to evaluate said sensor output signal also during a phase after an ignition is switched off until said shaft rotation ceases; storing a detected shaft position signal at the instant of the cessation of shaft rotation in a non-volatile memory provided in said microprocessor, and providing a shaft "standstill position" signal to said non-volatile memory; functioning said microprocessor further to include said shaft "standstill position" signal data in the control calculations for one of the injection and the ignition upon restart of said internal combustion engine.

15. A method as defined in claim 14; and further comprising the step of using a crankshaft as said shaft and assigning said sensor to the crankshaft.

16. A method as defined in claim 14; and further comprising the step of using a camshaft as said shaft and assigning said sensor to the camshaft.

17. A method as defined in claim 14; and further comprising the steps of providing another shaft position sensor; providing the crankshaft and the camshaft of an internal combustion engine with a crankshaft disc and a camshaft disc correspondingly; arranging a plurality of marks and at least one reference mark on the crankshaft disc to be sensed by said first mentioned sensor and arranging one mark on the camshaft disc to be sensed by, the other sensor; and determining a phase position by means of a defined position of said mark on the camshaft disc with respect to said reference mark on said crankshaft disc.

18. A method as defined in claim 14; and further comprising the steps of providing another shaft position sensor; providing a crankshaft and a camshaft of the internal combustion engine with a crankshaft disc and a camshaft disc correspondingly; arranging a plurality of marks and said at least one reference mark on the crankshaft disc to be sensed by said first mentioned sensor and arranging a plurality of marks matched to a number of cylinders on the camshaft disc to be sensed by the other sensor; and determining a phase position by means of a sequence of the marks on said camshaft disc.

19. A method as defined in claim 14, wherein the shaft is a crankshaft; and further comprising the steps of providing on said crankshaft a crankshaft having a reference mark; and determining exactly a position of said crankshaft by counting a number of increments after the occurrence of said reference mark.

20. A method as defined in claim 14, wherein the shaft is a camshaft; and further comprising the steps of providing another shaft position sensor; providing on said camshaft a camshaft disc with a segment to be sensed by the other sensor for determining a phase position of said reference mark on said crankshaft disc; and determining exactly a position of the camshaft by counting out a number of increments in relation to a phase position.

21. A method as defined in claim 14; and further comprising the step of carrying out a synchronization when the engine is switched on after a detection of a reference mark on the shaft, and then transferring the device to normal determination of an injection angular position.

22. A method as defined in claim 14; and further comprising the step of providing a detection of a direction of rotation.

23. A method as defined in claim 14; and further comprising the step of providing a correction of a shut-off position if the internal combustion engine turns backwards, by counting out increments during a reverse travel.

24. A method as defined in claim 14; and further comprising the step of providing a correction of a shut-off position if the internal combustion engine turns backwards, by comparing a determined shut-off position and a crankshaft position found during a synchronization.

25. A method as defined in claim 24; and further comprising the step of forming adaptable correction variables; and performing an adaptation in a cylinder-selective fashion.

* * * * *